United States Patent [19]
Wilson et al.

[11] Patent Number: 5,311,787
[45] Date of Patent: May 17, 1994

[54] POWER TAKE-OFF ADAPTOR

[75] Inventors: Robert J. Wilson, Warners; Arthur H. Bouchard, II, Cazenovia; John D. Zalewski, Liverpool, all of N.Y.

[73] Assignee: New Venture Gear, Inc., Troy, Mich.

[21] Appl. No.: 957,046

[22] Filed: Oct. 5, 1992

Related U.S. Application Data

[63] Continuation-in-part of Ser. No. 895,539, Jun. 8, 1992.

[51] Int. Cl.$^5$ .............. F16H 37/06; B60K 17/34; F16D 23/06
[52] U.S. Cl. ................ 74/15.88; 180/247; 192/53 F
[58] Field of Search ........... 74/15.8, 15.86, 15.88; 180/53.6, 53.7, 53.8; 192/48.91, 53 F

[56] References Cited
U.S. PATENT DOCUMENTS

| | | | |
|---|---|---|---|
| 1,258,383 | 3/1918 | Farmer | 74/15.88 |
| 1,533,531 | 4/1921 | White | 74/15.88 |
| 2,158,483 | 6/1937 | Peterson | 74/15.88 |
| 2,195,908 | 5/1938 | Wagner | 74/15.88 |
| 2,231,144 | 5/1938 | Wagner | 74/15.88 |
| 3,049,929 | 3/1959 | Wagner | 74/15.88 |
| 3,982,443 | 9/1976 | Fitch | 74/15.88 |
| 4,399,717 | 8/1983 | Funato et al. | 192/53 F X |
| 4,604,908 | 8/1286 | Dolan | 74/15.88 |
| 4,805,472 | 2/1989 | Aoki et al. | 180/247 X |
| 4,813,290 | 3/1989 | Hone | 74/15.88 |

Primary Examiner—Allan D. Herrmann
Attorney, Agent, or Firm—Harness, Dickey & Pierce

[57] ABSTRACT

A power take-off adaptor for use in a two-wheel drive vehicle equipped with automatic transmission for supporting a standard power take-off unit, thereby providing power take-off capabilities. A synchronizing shift arrangement is provided for shifting a clutch sleeve following speed synchronization between an output member and an input member of the adaptor.

4 Claims, 3 Drawing Sheets

POWER TAKE-OFF ADAPTOR

The present application is a continuation-in-part of U.S. Ser. No. 07/895,539 filed Jun. 8, 1992.

BACKGROUND OF THE INVENTION

The present invention relates generally to a power take-off arrangement for two-wheel drive motor vehicles equipped with automatic transmissions and, more particularly, to an improved power take-off adaptor constructed for retro-fit installation into standard production drivelines.

A power take-off utilizes the powertrain of a motor vehicle to drive auxiliary mechanisms (winches, hydraulic lifts, etc.) that are either mounted on or carried by the vehicle. While most power take-off arrangements are typically associated with four-wheel drive vehicles having manual transmissions, it is also desirable to provide power take-off capabilities on two-wheel drive vehicles equipped with automatic transmissions.

Modernly, there are three types of power take-off arrangements used in association with vehicles equipped with automatic transmissions. First, a belt-driven power take-off apparatus (PTO) can be mounted to the fan belt section of the vehicle's engine. Unfortunately, due to the large number of auxiliary elements commonly mounted to the engine, and the relatively small space provided within the engine compartment, attachment of a power take-off to the fan belt section of the motor vehicle is rather difficult. Alternatively, some power take-off arrangements utilize a gear fixed for rotation with the output shaft of the automatic transmission for transferring power to a power take-off unit mounted to the transmission casing. While taking power from such a take-off gear in an automatic transmission is advantageous over belt driven systems, the low production volumes typically necessitate expensive rework or modification of pre-existing automatic transmissions. Finally, it is known to couple an "adaptor" between the output shaft of the automatic transmission and the drive shaft of the motor vehicle.

One example of a conventional adaptor is shown in U.S. Pat. No. 4,813,290. Unfortunately, several designs constraints are generally associated with such adaptors which severely impact their utilization in conjunction with high-volume original equipment drivetrain components. More specifically, the automatic transmission housing must typically be reworked to accept "bolt-up" mounting of the adaptor thereto. In addition, the length of the drive shaft must be shortened to accommodate the adaptor housing. Moreover, such power take-off adaptors typically operate to only transmit drive torque from the output shaft of the automatic transmission to either of the power take-off or the vehicle drive shaft. As such, drive torque can only be transmitted to the power take-off when the motor vehicle is motionless. This is undesirable since certain power take-off applications require vehicle movement, such as snowplowing and winching. Furthermore, most conventional power take-off adaptors have no provisions for a speedometer gear or tone wheel such that mileage is accumulated while the power take-off is operated with the vehicle in a stationary condition.

SUMMARY OF THE INVENTION

It is an object of the present invention to provide an improved power take-off adaptor which overcomes the disadvantages associated with prior art adaptors and which mounts directly to the automatic transmission of a two-wheel motor vehicle for rotatably coupling the transmission output shaft to the drive shaft. As a related object, the power take-off adaptor of the present invention includes means for releasably mounting and supporting a standard power take-off unit for providing power take-off capabilities when the motor vehicle is either in a stationary or motive condition.

It is another object of the present invention to provide a power take-off adaptor that can be easily incorporated into a two-wheel drivetrain made up of standard production component that do not have to be reworked or modified. As such, utilization of the improved adaptor permits vehicle manufacturers to offer the power take-off arrangement as an original equipment option or as an aftermarket retro-fit option. In addition, the use of high-volume production components is effective in minimizing the overall cost of integrating power take-off capabilities into conventional two-wheel drive drivetrain arrangements.

Accordingly, the power take-off adaptor of the present invention includes a housing assembly, an input member rotatably supported within the housing assembly and coupled to the output shaft of the automatic transmission, and an output member rotatably supported within the housing assembly and coupled to the drive shaft. A take-off gear is fixed for rotation on the input member and is radially aligned with an opening formed in the housing assembly. A standard power take-off unit (PTO) can be removably mounted to the housing assembly for permitting an output gear to meshingly engage the take-off gear for providing power take-off capabilities. A clutch collar is supported on the output member for rotation therewith and axial sliding movement thereon between first and second operating positions. A synchronized shift arrangement permits the vehicle operator to selectively shift the clutch collar from the first operating position wherein the input member drives the take-off gear independently of the output member, to the second operating position wherein the input member is drivingly coupled to the output member for delivering drive torque to the drive shaft while concurrently driving the take-off gear.

BRIEF DESCRIPTION OF THE DRAWINGS

Other objects and advantages of the present invention will become readily apparent to those skilled in the art upon review of the following written specification taken in conjunction with the drawings in which.

DETAILED DESCRIPTION OF THE INVENTION

Figure 1:
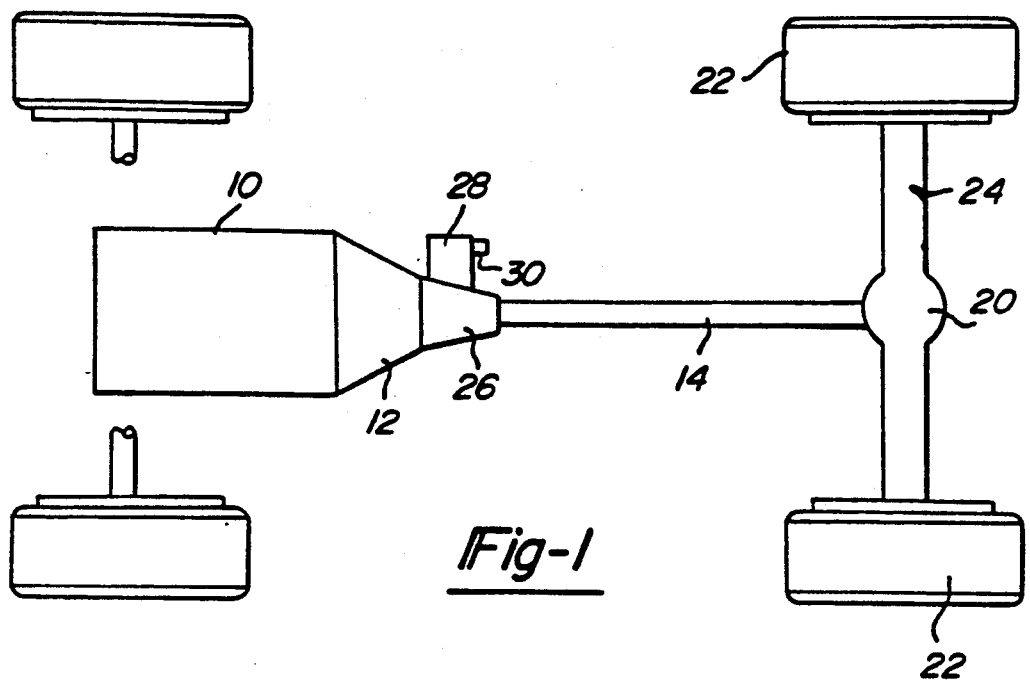
FIG. 1 schematically illustrates an exemplary two-wheel drive motor vehicle drivetrain incorporating the power take-off adaptor of the present invention.

With particular reference to FIG. 1, an exemplary two-wheel drive (i.e., rear wheel drive) vehicle drivetrain is schematically shown to include an engine 10, an automatic transmission 12, and a drive shaft 14 having one end coupled to a differential 20 for driving wheels 22 via axle assembly 24, all of which are conventional in design. In accordance with the present invention, a power take-off adaptor 26 is operatively coupled between an output shaft of automatic transmission 12 and the opposite end of drive shaft 14. In addition, a standard SAE 6-bolt power take-off (PTO) 28 is schematically shown as being removably mounted to adaptor 26. In general, power take-off adaptor 26 is constructed for permitting a vehicle operator to selectively couple the output of automatic transmission 12 to drive shaft 14 while concurrently providing means for transferring drive torque from the output of automatic transmission 12 to power take-off 28. In this manner, power can be delivered to power take-off 28 through power take-off adaptor 26 when the motor vehicle is in either of a stationary or motive operating condition. A take-off shaft 30, extending from power take-off 28, is driven by adaptor 26 for transferring drive torque to an auxiliary apparatus (i.e., winches, lifts, augers, etc.) coupled thereto.

One of the primary advantageous associated with adaptor 26 is that motor vehicle manufacturers can offer a power take-off arrangement as an original equipment option for a two-wheel drive vehicle equipped with an automatic transmission using only pre-existing drivetrain components that do not require modification or rework. In general, power take-off adaptor 26 is constructed to dimensionally simulate a conventional transfer case installed between automatic transmission 12 and drive shaft 14 in four-wheel drive motor vehicles. Therefore, since automatic transmission 12 and drive shaft 14 are original equipment components that are normally used in high volume four-wheel drive vehicles, they can be simply installed in the two-wheel drive power take-off arrangement of the present invention. More particularly, power take-off adaptor 26 has a housing that is designed to be bolted directly to automatic transmission 12 in place of the conventional four-wheel drive transfer case, while an output member of power take-off adaptor 26 is coupled to drive shaft 14 in a manner identical to that of an output member of the transfer case being coupled to drive shaft 14. Therefore, component proliferation is minimized while drivetrain reliability and performance is enhanced due to utilization of pre-existing high volume components. Moreover, the cost of adaptor 26 is significantly reduced due to utilization of such pre-existing components that were originally produced for assembly in a four-wheel drive transfer case.

With particularly reference to FIGS. 2 and 3, power take-off adaptor 26 will now be described in greater detail. Adaptor 26 includes a housing 40 forming an end wall 42 and a side wall 44 extending therefrom in one axial direction. End wall 42 has a radial hub portion 46 formed therein having an axial bore 48 journally supporting an input shaft 50 therein via a suitable bearing assembly 52. Housing 40 also includes a removable end cap 54 fitted on end wall 42 by means of a plurality of machine screws or bolts 56. End cap 54 has a central opening for receiving input shaft 50 and abuts the outer race of bearing assembly 52 for retention against axial outward movement. A snap ring located in an angular groove formed in the outer race of bearing assembly 52 retains bearing assembly 52 against inward axial movement. A second snap ring is fitted within a groove formed in input shaft 50 for locating input shaft 50 against inner race of bearing assembly 52. In addition, input shaft 50 defines a thrust surface 62 for transferring an axially directed thrust loads to bearing assembly 52. Thus, input shaft 50 is radially and axially aligned in housing 40 by means of a single bearing assembly 52. In addition, such construction allows bearing assembly 52 to be easily serviced or replaced by removing end cap 54 and the snap rings.

Following assembly of end cap 54 onto end wall 42, a flange formed on housing end wall 42 can be easily mounted directly to a standard mounting flange formed on automatic transmission 12 via a plurality of studs 66. As best seen from FIG. 2, studs 66 are equally spaced on end wall mounting flange 64 and are arranged to replicate the mounting pattern used on a four-wheel drive transfer case for directly mounting power take-off adaptor 26 to the mating mounting flange of automatic transmission 12 in substitution therefor. In this manner, automatic transmission 12 is an original equipment component that does not require any modification prior to installation of power take-off adaptor 26 thereon.

Figure 3:
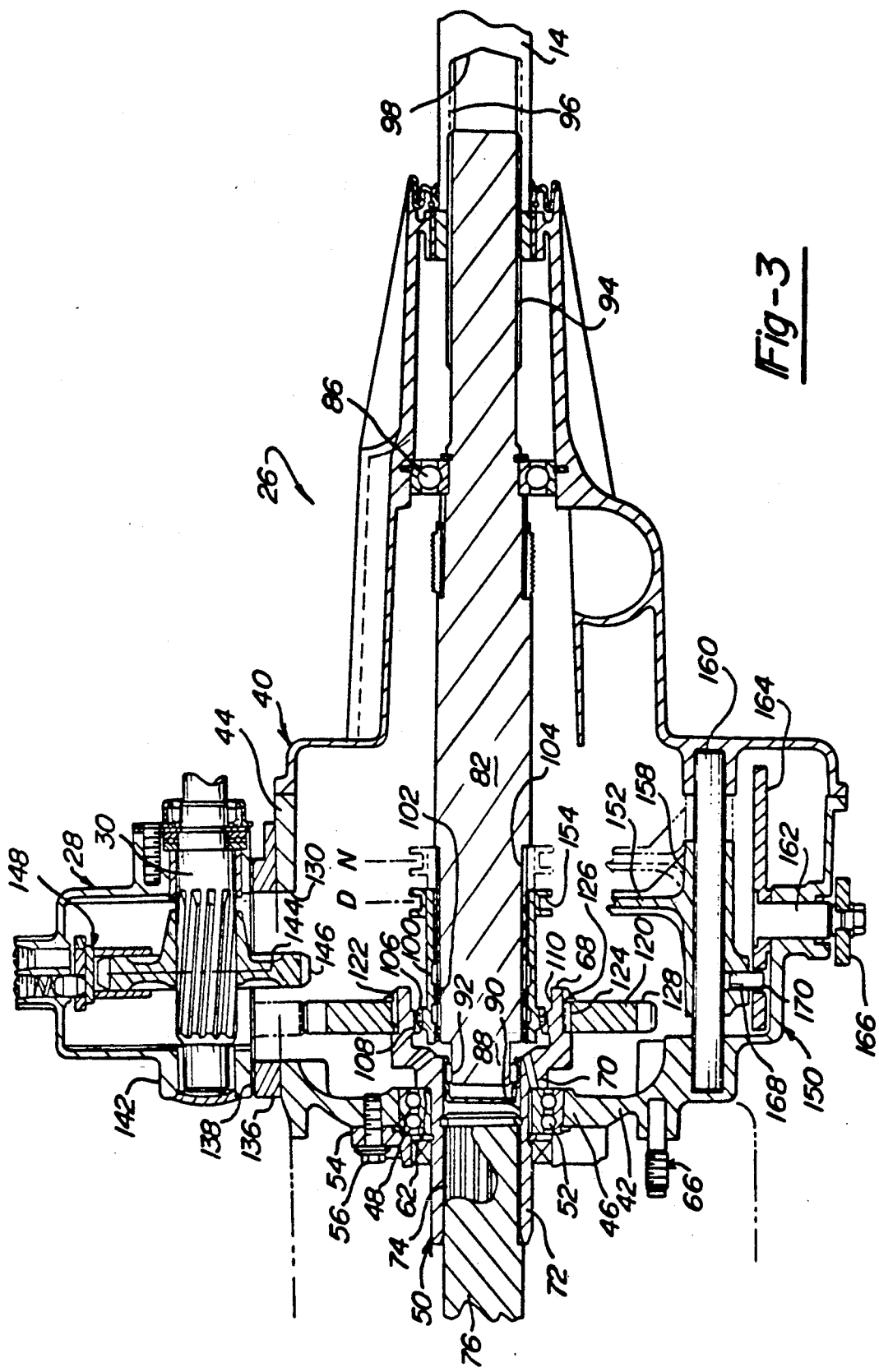
FIG. 3 is a cross-sectional view taken along line 3—3 of FIG. 2 showing a standard power take-off unit removably mounted to the power take-off adaptor.

As seen in FIG. 3, input shaft 50 terminates in an outwardly stepped axially extending flange portion 68 joined by an intermediate stepped radially extending flange portion 70. An elongated tubular portion 72 of input shaft 50 projects outwardly through end wall 42 and has longitudinally extending internal splines 74 formed thereon which are adapted to mesh with external splines formed on output shaft 76 of automatic transmission 12. As such, input shaft 50 is directly driven for rotation within housing 40 by transmission output shaft 76. An output shaft 82 is aligned along a common longitudinal axis with input shaft 50 and transmission output shaft 76 and is supported for rotation within housing 40 by a suitable bearing assembly 86. Output shaft 82 has a piloted end 88 disposed within inner bore 90 of input shaft 50 by a suitable bearing assembly, such as needle bearing assembly 92. The opposite end of output shaft 82 is formed to include longitudinally extending external splines 94 for driving connection to internal splines 96 formed in an axially extending pilot bore 98 of drive shaft 14. However, it will be appreciated by those skilled in the art that a suitable cordon joint, universal joint or any other known coupling device may be used for coupling output shaft 82 to drive shaft 14. Furthermore, a clutch collar 100 is fixed for rotation on output shaft 82 and is axially slidable thereon by means of collar internal splines 102 engaging external splines 104 formed on output shaft 82. Clutch collar 100 has external dog or clutch teeth 106 shown slidably engaged with internal dog or clutch teeth 108 formed within an axial counterbore 110 of input shaft flange portion 68. In the operative position shown, identified by construction line "D", drive torque is transferred from transmission output shaft 76 to adaptor output shaft 82 via adaptor input shaft 50 and clutch collar 100 for establishing a "direct-drive" condition wherein power is delivered to drive shaft 14. As will be appreciated, movement of clutch collar 100 to the "Neutral" position, identified by construction line "N", acts to interrupt the transfer of drive torque to drive shaft 14.

In accordance with preferred construction of adaptor 26, a power take-off gear 120 is fixedly secured for rotation with input shaft 50. More particularly, external splines 122 are formed along the external periphery of flange 68 and which are provided for engaging internal splines 124 formed on the inner periphery of take-off output gear 120. A snap ring 126 is provided for retaining take-off output gear 120 on input shaft 50. As such, take-off output gear 120 is directly and continuosly driven by transmission output shaft 76 via input shaft 50. In addition, power take-off output gear 120 has gear teeth 128 formed along its external peripheral surface.

Figure 2:
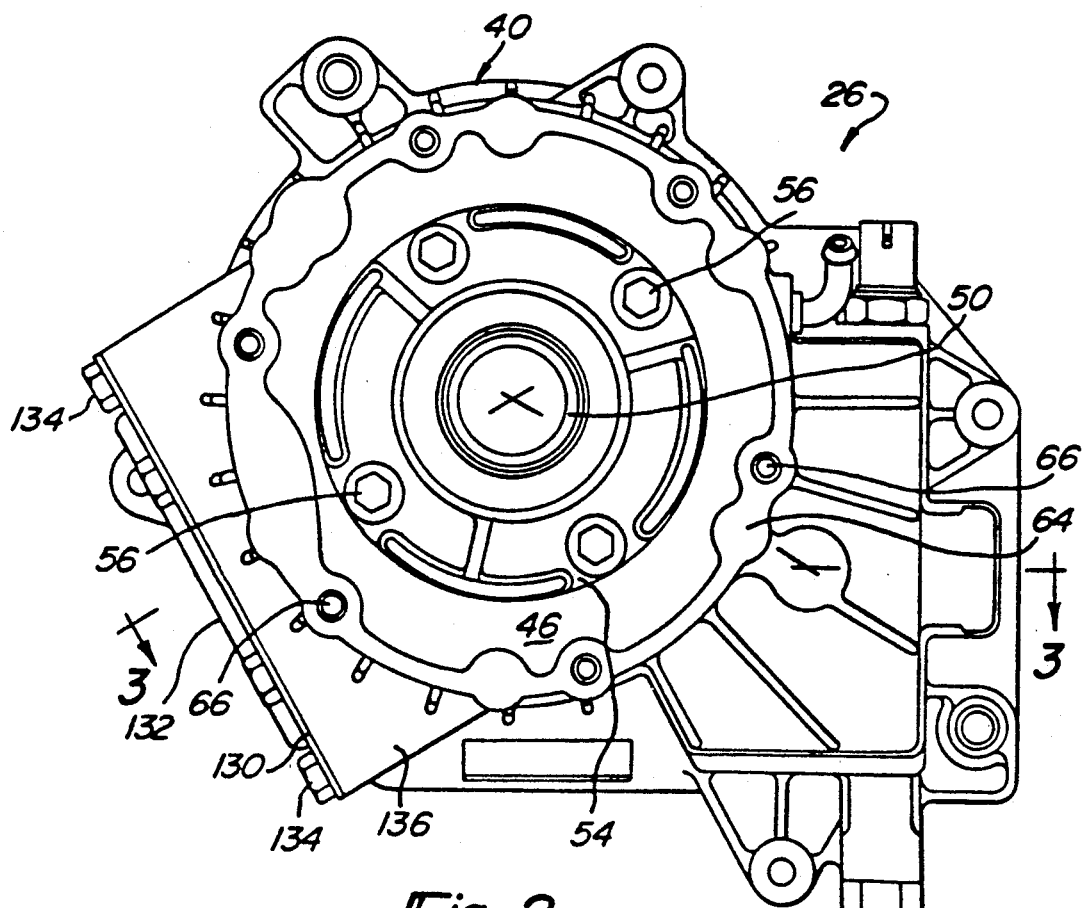
FIG. 2 is an elevational end view of the power take-off adaptor.

With continued reference to FIGS. 2 and 3, a portion of housing side wall 44 which is located in close proximity to take-off output gear 120 defines a rectangular access opening or aperture 130 to provide means for removably mounting the conventional SAE 6-bolt power take-off unit 28 on adaptor housing 40. As is known, power take-off 28 is operable for transferring drive torque from take-off output gear 120 to an auxiliary apparatus (i.e., winch, auger, snow plow, etc.). When the vehicle operator does not wish to use power take-off 28, it may be removed from housing 40 such that a cover 132 can be secured over aperture 130 via bolts 134 for preventing leakage of fluid from within adaptor 26.

Power take-off 28 is shown in FIG. 3 mounted on a housing flange 136 such as by bolts 134. Sealing means 138 are provided between flange 136 and power take-off 28 for providing a fluid tight seal therebetween. Power take-off 28 includes a longitudinally extending take-off shaft 30 journalled in a casing 142 and which is positioned parallel with the central longitudinal axis of adaptor 26. Take-off shaft 30 has a driven gear 144 splined thereon for axial sliding movement and rotation therewith. Driven gear 144 is sized such that its external peripheral gear teeth 146 extend radially through aperture 130 so as to be positioned for sliding engagement with gear teeth 128 of take-off output gear 120. Thus, driven gear 144 can be selectively shifted on take-off shaft 30 between a "disengaged" position (shown) and an "engaged" position (shown in dashed lines) via a suitable shift mechanism 148. As will be appreciated, once driven gear 144 is shifted to the "engaged" position, power is delivered thereto from transmission output shaft 76 to take-off shaft 30 via adaptor input shaft 50, take-off output gear 120 and driven gear 144. Preferably, shift mechanism 148 is coupled to a shift lever located within the passenger compartment of the motor vehicle for permitting the vehicle operator to selectively move shift mechanism 148 between the "engaged" and "disengaged" positions. As will be appreciated, driven gear 144 can only be shifted into the "engaged" position when transmission output shaft 76 is non-driven (i.e., automatic transmission 12 is in "neutral"). Alternatively, power take-off 28 could be of the type having driven gear 144 constantly meshing output gear 120 for eliminating the necessity of shift mechanism 148.

An exemplary shift fork assembly 150 is provided for shifting clutch collar 100 between the "drive" mode and the "neutral" mode via selective actuation by the vehicle operator. Shift fork assembly 150 includes a mode fork 152 having forked projections (not shown) that are retained within an annular groove 154 formed in clutch sleeve 100. Mode fork 152 includes an arm formed integral with a longitudinally extending cylindrical tube member 158. A shift rail 160 is received within tube member 158 and its opposite ends are suitably supported in fore and aft sockets formed in housing 40. A rotatable actuating shaft 162 is supported in the interior of adaptor housing 40 for rotation. A first end of actuating shaft 162 is secured to a sector plate 164. A shift lever 166 is suitably connected to the opposite end of actuating shaft 162 for causing rotation of actuating shaft 162 and sector plate 164 under the selective control of the vehicle operator. It will be understood that actuating shaft 162 can be rotated either manually or mechanically (such as by an electric drive motor) without departing from the fair scope of the present invention.

From FIG. 3 it can be seen that a pin 168 is mounted in tube member 158 of mode fork 152 and extends through a contoured slot 170 formed in sector plate 164. Due to the contour of slot 170, rotation of sector plate 164 in a first direction causes corresponding axial displacement of pin 168, mode fork 152 and clutch sleeve 100 along shift rail 160 from the "Drive" mode position to the "Neutral" mode position of adaptor 26, whereby the transfer of drive torque to output shaft 82 is interrupted. As will be appreciated, rotation of sector plate 164 in an opposite or second direction functions to reverse the shifting sequence. Moreover, transmission shaft 76 must be in a non-driven condition (i.e., automatic transmission 12 in "Neutral") during selective shifting of power take-off adaptor 26 from the "Neutral" mode into the "Drive" mode.

When clutch collar 100 is shifted into its "Drive" mode position, clutch collar dog teeth 106 engage dog teeth 108 formed within counter bore 110 of stepped flange section 68 for coupling input shaft 50 with output shaft 82. Again, transmission shaft 76 and adaptor input shaft 50 should be in a non-driven mode when clutch collar 100 is shifted into the "Drive" mode to avoid clashing of dog teeth 106 and 108. Accordingly, a first torque transmission path is established from transmission output shaft 76 through adaptor input shaft 50 and collar 100 to drive shaft 14 for driving wheels 22 such that the vehicle is in a "motive" condition. Shifting of collar 100 to its "Neutral" mode acts to interrupt the first torque transmission path such that drive torque is not delivered to drive shaft 14. In addition, a second torque transmission path can be established from transmission output shaft 76 to take-off shaft 30 through adaptor input shaft 50, take-off output gear 120 and driven gear 144. The second torque transmission path can be established, such that power take-off unit 28 delivers power to an auxiliary component while the motor vehicle is in either a motive or non-motive condition.

Figure 4:
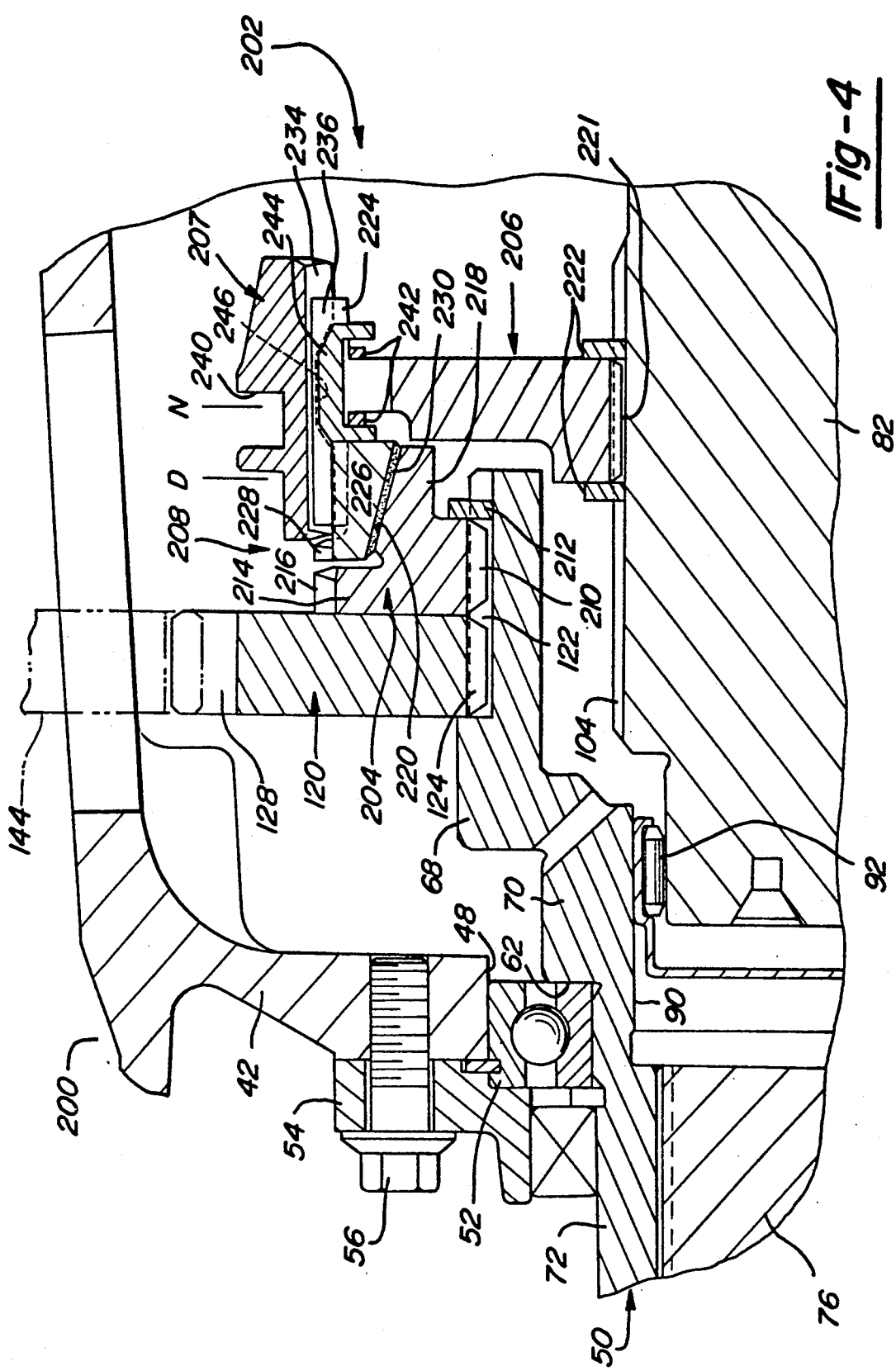
FIG. 4 is an enlarged cross-sectional view of an alternative construction for the power take-off adaptor having a synchronized shift arrangement incorporated therein.

In accordance with an alternative embodiment of the present invention, FIG. 4 illustrates a power take-off adaptor 200 which is substantially identical to power take-off adaptor 26, with the exception that a synchronized shift arrangement 202 has been incorporated therein to assist the vehicle operator in shifting from the "Neutral" mode into the "Drive" mode. More specifically, since output shaft 82 is not coupled to input shaft 50 when power take-off adaptor 200 is in the "Neutral" mode, residual viscous drag forces act on transmission output shaft 76 from within automatic transmission 12 for causing rotation of adaptor input shaft 50 when automatic transmission 12 is in its non-driven "Neutral" state. Thus, synchronized shift arrangement 202 is operable for overcoming any relative speed differential between output shaft 82 and input shaft 50 to provide a smooth "clash-free" shift transition. In addition, it is also contemplated that synchronized shift arrangement 202 could also be operable for permitting the vehicle operator to shift power take-off adaptor 200 into the "Drive" mode "on-the-fly" for delivering drive torque from adaptor input shaft 50 to adaptor output shaft 82 when transmission output shaft 76 is being driven (i.e., automatic transmission 12 is in a Drive or Reverse gear). Thus, drive torque can be delivered from output shaft 82 to drive shaft 14 and, in turn, to wheels 22 without first shifting automatic transmission 12 to its "Neutral" position. In view of the commonality of the components, like numbers are used to identify those components that are identical or substantially similar to those previously described with reference to power take-off adaptor 26.

According to the specific construction of power take-off adaptor 200 shown in FIG. 4, synchronized shift arrangement 202 includes a drive member 204 coupled for rotation with input shaft 50, a hub member 206 coupled for rotation with output shaft 82, and a clutch collar 207 for coupling hub member 206 to drive member 204 in response to energization of a synchronizer clutch apparatus 208. More specifically, drive member 204 has internal splines 210 which meshingly engage external splines 122 on flange portion 68 of input shaft 50 and is retained thereon via a snap ring 212. As such, drive member 204 is rotatably driven by input shaft 50 and is shown to include a radially projecting disk portion 214 having external clutch teeth 216 formed along its outer periphery. Extending transversely from disk portion 214 is an annular rim projection 218 on which is formed an external frusto-conical friction surface 220.

Hub member 206 is shown to include internal spline teeth 221 which meshingly engage external spline teeth 104 of output shaft 82. Thus, hub member 206 is fixed for rotation with rear output shaft 82 and is axially restrained thereon via snap rings 222. Hub member 206 has an outer cylindrical portion 224 which generally encircles a blocker ring 226. Blocker ring 226 has external clutch teeth 228 and an internal frusto-conical friction surface 230 arranged to generally surround external frusto-conical friction surface 220 on rim projection 218 of drive member 204. Finally, clutch collar 207 is formed with internal spline teeth 234 which are in constant axial sliding engagement with external spline teeth 236 formed on cylindrical portion 224 of hub member 206.

When it is desired to shift power take-off adaptor 200 from the "Neutral" mode into the "Drive" mode, a shift fork (not shown), engaged in an annular groove 240 of clutch collar 207, is moved via shift fork assembly 150 for causing axial movement thereof. As noted, when clutch collar 207 is in the "Neutral" position shown in FIG. 4, no drive torque is transmitted from input shaft 50 to output shaft 82, whereby no power is supplied for driving the vehicle's ground-engaging wheels 22. In operation, synchronized shift arrangement 202 is constructed to cause speed synchronization between input shaft 50 and output shaft 82 for overcoming relative speed differences therebetween. As noted, such speed differences are caused by fluid drag forces acting on transmission output shaft 76 from within automatic transmission 12 such that input shaft 50 is rotatably driven at a speed greater than output shaft 82.

Synchronizer apparatus 208 is generally shown as a conventional strut-type blocking synchronizer, it being understood however that other types of synchronizer mechanisms could be used without departing from the scope of the present invention. Synchronizer clutch apparatus 208 includes a thrust mechanism for axially moving blocker ring 226 toward disk portion 214 of drive member 204 upon axial movement of clutch collar 207. The thrust mechanism is shown to include a pair of circular energizing springs 242 that are compressed and inserted between a plurality of circumferentially spaced key-like struts 244. As such, struts 244 are retained and outwardly biased within longitudinally extending slots formed in outer cylindrical portion 224 of hub member 206. Each strut 244 has a raised central "bump" portion which is normally biased by energizing springs 242 into engagement with a corresponding detent groove 246 formed in internal spline teeth 234 when clutch collar 207 is in the "Neutral" position. As will be appreciated, initial axial movement of clutch collar 207 toward take-off gear 120 causes struts 244 to contact blocker ring 226 such that running clearances between the frusto-conical friction surfaces 220 and 230 are eliminated. Thus, a detent load is built up such that blocker ring 226 and drive member 204 are loaded upon struts 244 riding out of detent groove 246. Thereafter, a frictional "cone" torque loading is developed due to the frictional loading between blocker ring inner frusto-conical surface 230 and external frusto-conical surface 220 of drive member 204, whereby blocker ring 226 is caused to rotate to a "clocked" position. In this position, the chamfers on sleeve splined teeth 234 contact the chamfers on blocker ring clutch teeth 228 for blocking the continued axial passage of clutch collar 207 therethrough.

When the rotational speed of drive member 204 is substantially synchronous with hub member 206 and, in turn, output shaft 82, the speed synchronization process is complete and blocker ring 226 is no longer energized. Since the index torque resulting from the chamfer-to-chamfer loading between clutch collar internal splines 234 and blocker ring clutch teeth 228 now exceeds the cone torque, blocker ring 226 is free to rotate in an opposite direction from its "clocked" position so as to permit clutch collar 207 to pass beyond blocker ring teeth 228. Continued axial sliding movement of clutch collar 207 results in meshing engagement between clutch collar spline teeth 234 and clutch teeth 216 on drive member 204. In this manner, output shaft 82 is coupled to input shaft 50 via clutch collar 207 coupling drive member 204 to hub member 206. As will be appreciated, sliding movement of clutch collar 207 in an opposite direction causes disengagement of clutch collar 207 from drive member 204 for returning power take-off adaptor to its "Neutral" mode. As noted earlier, actuating shaft 162 of shift fork assembly 150 can be rotated either manually or automatically (i.e., motor driven).

While the above-detailed description describes preferred embodiments of the present invention, it is to be understood that the present invention is susceptible to modification, variation and alteration without deviating from the scope and fair meaning of the subjoined claims.

What is claimed is:

1. An adapter unit for a two-wheel drive motor vehicle of the type having a source of driving torque and incorporating a conventional four-wheel drive transmission including a transmission output shaft, the adapter unit comprising:

a first housing adapted at a first end to receive the transmission output shaft;

a drive shaft journally supported within the housing for delivering the driving torque from the source of power to ground engaging wheels;

an input shaft journally supported within the housing and coupled between the transmission output shaft and the drive shaft;

a power take-off output gear having an externally splined surface and being fixed to the input shaft;

an aperture formed in the first housing adjacent the powered take-off gear;

a power take-off unit contained within a second housing, the second housing being completely independent from the first housing and detachable therefrom, a power take-off output shaft journally supported therein, an input gear fixed to the power take-off output shaft, the input gear being adapted for meshing engagement with the power take-off output gear for delivering driving torque to the power take-off output shaft;

synchronizer means for on-the-fly delivery of the driving torque to the drive shaft; and means for detachably securing the first housing to the second housing;

whereby the adapter unit converts the conventional four-wheel drive transmission for use in the two-wheel drive vehicle and further equips the vehicle with a power take-off provision.

2. The adapter unit of claim 1, wherein said synchronizer means comprises a synchronizer arrangement including:

a drive member including clutch teeth and a frusto-conical friction surface, the drive member being coupled for rotation with the input shaft;

an externally splined hub fixed for rotation on the drive shaft;

a shift sleeve having an internally splined surface slidably coupled to the hub externally splined surface and being axially movable thereon in a first direction from a neutral position to a first operative position wherein the shift sleeve internally splined surface engages the clutch teeth of the drive member for coupling the drive shaft for rotation with the input shaft; and a blocker ring having external clutch teeth and an internal frusto-conical friction surface arranged to generally surround the frusto-conical friction surface on the drive member.

3. A power take-off arrangement for a two-wheel drive motor vehicle having a source of driving torque, and a conventional four-wheel drive automatic transmission having a transmission output shaft, and a transfer case having a first housing, the power take-off arrangement comprising:

an adapter unit having a first housing;

an input shaft journally supported within the first housing and coupled to the transmission output shaft;

a drive shaft for delivering the driving torque from the source of power to ground engaging wheels;

an output shaft journally supported within the housing and coupled to the drive shaft;

a collar fixed for rotation with the output shaft and axially slidable thereon between a first position coupled to the input shaft for establishing a torque transmission path between the transmission output shaft and the drive shaft, and a second position for interrupting the torque transmission path;

a power take-off output gear fixed to the input shaft;

an aperture formed in the first housing adjacent the power take-off output gear;

a power take-off unit including a second housing, a power take-off output shaft journally supported therein, an input gear fixed to the power take-off output shaft, the input gear being adapted for meshing engagement with the power take-off output gear for delivering driving torque to the power take-off output shaft;

synchronizer means for on-the-fly delivery of the driving torque to the drive shaft; and means for detachably securing the first housing to the second housing;

whereby the adapter unit converts the conventional four-wheel drive transmission for use in the two-wheel drive vehicle and further equips the vehicle with a power take-off provision.

4. The power take-off arrangement of claim 3, wherein the synchronizer means comprises a synchronizer arrangement including:

a drive member including clutch teeth and a frusto-conical friction surface, the drive member being coupled for rotation with the input shaft;

an externally splined hub fixed for rotation on the drive shaft;

a shift sleeve having an internally splined surface slidably coupled to the hub externally splined surface and being axially movable thereon in a first direction from a neutral position to a first operative position wherein the shift sleeve internally splined surface engages the clutch teeth of the drive member for coupling the drive shaft for rotation with the input shaft; and a blocker ring having external clutch teeth and an internal frusto-conical friction surface arranged to generally surround the frusto-conical friction surface on the drive member.

* * * * *